United States Patent
Jancula et al.

(10) Patent No.: US 8,826,396 B2
(45) Date of Patent: Sep. 2, 2014

(54) PASSWORD RESET SYSTEM

(75) Inventors: Jeffrey John Jancula, Charlotte, NC (US); Charles William Porter, Belmont, NC (US); Linda Lee Fix, Hamburg, PA (US)

(73) Assignee: Wells Fargo Bank, N.A., Charlotte, NC (US)

( * ) Notice: Subject to any disclaimer, the term of this patent is extended or adjusted under 35 U.S.C. 154(b) by 1566 days.

(21) Appl. No.: 11/966,928

(22) Filed: Dec. 28, 2007

(65) Prior Publication Data
US 2009/0158406 A1 Jun. 18, 2009

Related U.S. Application Data

(60) Provisional application No. 61/012,963, filed on Dec. 12, 2007.

(51) Int. Cl.
G06F 15/16 (2006.01)
G06F 21/46 (2013.01)

(52) U.S. Cl.
CPC .................................... G06F 21/46 (2013.01)
USPC ............ 726/6; 726/8; 726/5; 726/17; 726/18; 709/205

(58) Field of Classification Search
CPC ......... G06F 15/16; G06F 21/41; G06F 21/46; G06F 21/31
USPC ............................ 726/6, 5, 8, 17, 18; 709/205
See application file for complete search history.

(56) References Cited

U.S. PATENT DOCUMENTS

| | | | | |
|---|---|---|---|---|
| 5,450,491 A * | 9/1995 | McNair | | 713/184 |
| 5,734,718 A * | 3/1998 | Prafullchandra | | 713/183 |
| 5,832,211 A * | 11/1998 | Blakley et al. | | 726/6 |
| 5,838,903 A * | 11/1998 | Blakely et al. | | 726/5 |
| 5,862,323 A * | 1/1999 | Blakley et al. | | 726/13 |
| 6,643,784 B1* | 11/2003 | McCulligh | | 726/18 |
| 6,662,300 B1* | 12/2003 | Peters | | 713/182 |
| 7,117,359 B2* | 10/2006 | Wood et al. | | 713/155 |
| 7,191,466 B1* | 3/2007 | Hamid et al. | | 726/3 |
| 7,685,431 B1* | 3/2010 | Mullany | | 713/184 |

(Continued)

FOREIGN PATENT DOCUMENTS

CA 2638417 A1 * 1/2009

OTHER PUBLICATIONS

Unknown author; Strong passwords: How to create and use them; Mar. 22, 2006; Microsoft security at home; 2 Pages.*

Primary Examiner — Tamara T Kyle
Assistant Examiner — Anthony Fabbri
(74) Attorney, Agent, or Firm — Kegler Brown Hill & Ritter; James J. Pingor

(57) ABSTRACT

A customer initiated password reset system resets user passwords on a variety of network entities, such as internal systems, allowing simultaneous reset with a minimum number of user specified passwords that nonetheless satisfy the password specifications of these internal systems. Thereby, the user avoids the tedium of logging into each of these systems, changing their password, logging out, etc., for each system with the likelihood of creating unique passwords for each system that have to be remembered. By further incorporating a score metric based upon how many character sets are touched, a required degree of complexity can be measured and enforced against the password specifications. Advantageously, a table-based approach to enforcing password reset against the multiple password specifications facilitates making and fielding updates.

24 Claims, 10 Drawing Sheets

(56) References Cited

U.S. PATENT DOCUMENTS

| | | | |
|---|---|---|---|
| 2001/0034735 A1* | 10/2001 | Sugiyama | 707/104.1 |
| 2002/0065723 A1* | 5/2002 | Anderson et al. | 705/14 |
| 2002/0073339 A1* | 6/2002 | Card | 713/201 |
| 2002/0109677 A1* | 8/2002 | Taylor | 345/173 |
| 2003/0037262 A1* | 2/2003 | Hillhouse | 713/202 |
| 2004/0030932 A1* | 2/2004 | Juels et al. | 713/202 |
| 2004/0044896 A1* | 3/2004 | Kelley et al. | 713/183 |
| 2004/0064742 A1* | 4/2004 | Excoffier et al. | 713/202 |
| 2004/0073815 A1* | 4/2004 | Sanai et al. | 713/202 |
| 2004/0168068 A1* | 8/2004 | Goal et al. | 713/184 |
| 2004/0250141 A1* | 12/2004 | Casco-Arias et al. | 713/202 |
| 2005/0091338 A1* | 4/2005 | de la Huerga | 709/217 |
| 2005/0091539 A1* | 4/2005 | Wang et al. | 713/201 |
| 2005/0129246 A1* | 6/2005 | Gearhart | 380/278 |
| 2005/0166259 A1* | 7/2005 | Neupart | 726/1 |
| 2008/0115223 A1* | 5/2008 | Morris et al. | 726/27 |

\* cited by examiner

PASSWORD RESET SYSTEM

CLAIM OF PRIORITY UNDER 35 U.S.C. §119

The present Application for Patent claims priority to Provisional Application No. 61/012,963 entitled "Password Reset System" filed 12 Dec. 2007, and assigned to the assignee hereof and hereby expressly incorporated by reference herein.

BACKGROUND

This disclosure relates generally to data processing systems and, more particularly, to password maintenance among data processing systems, and especially to user interfaces for guiding a user to reset one or more passwords.

Often users have to access a number of secure network entities (e.g., a host network, separate networks, a process running on a host network, etc.). These entities can require user passwords for authentication purposes. Since such systems can be developed by different suppliers over a period of time, the password specifications accepted by each secure network entity can differ. With increasingly sophisticated attacks on the security of such systems, these password specifications have tended toward becoming more difficult to hack and to expiring more often. This poses a challenge for users to reset their passwords successfully.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with guiding a user to reset a plurality of passwords with optimally a single password that satisfies the different password specifications for various network entities.

In one aspect, a method guides a user to simultaneously reset a plurality of passwords. A first password specification for a first network entity and a second password specification for a second network entity are both accessed. An aggregate password specification that satisfies both the first and second password specification is determined. The user is then prompted to input a new password that satisfies the aggregate password specification to reset both a first and second password for the first and second network entities respectively.

In another aspect, an apparatus a password reset agent accesses both a first password specification for a first network entity and a second password specification for a second network entity. A processing component determines an aggregate password specification that satisfies both the first and second password specification. A user interface prompts a user to input a new password that satisfies the aggregate password specification to reset both a first and second password for the first and second network entities respectively.

In yet another aspect an apparatus provides means for performing the afore-mentioned method.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
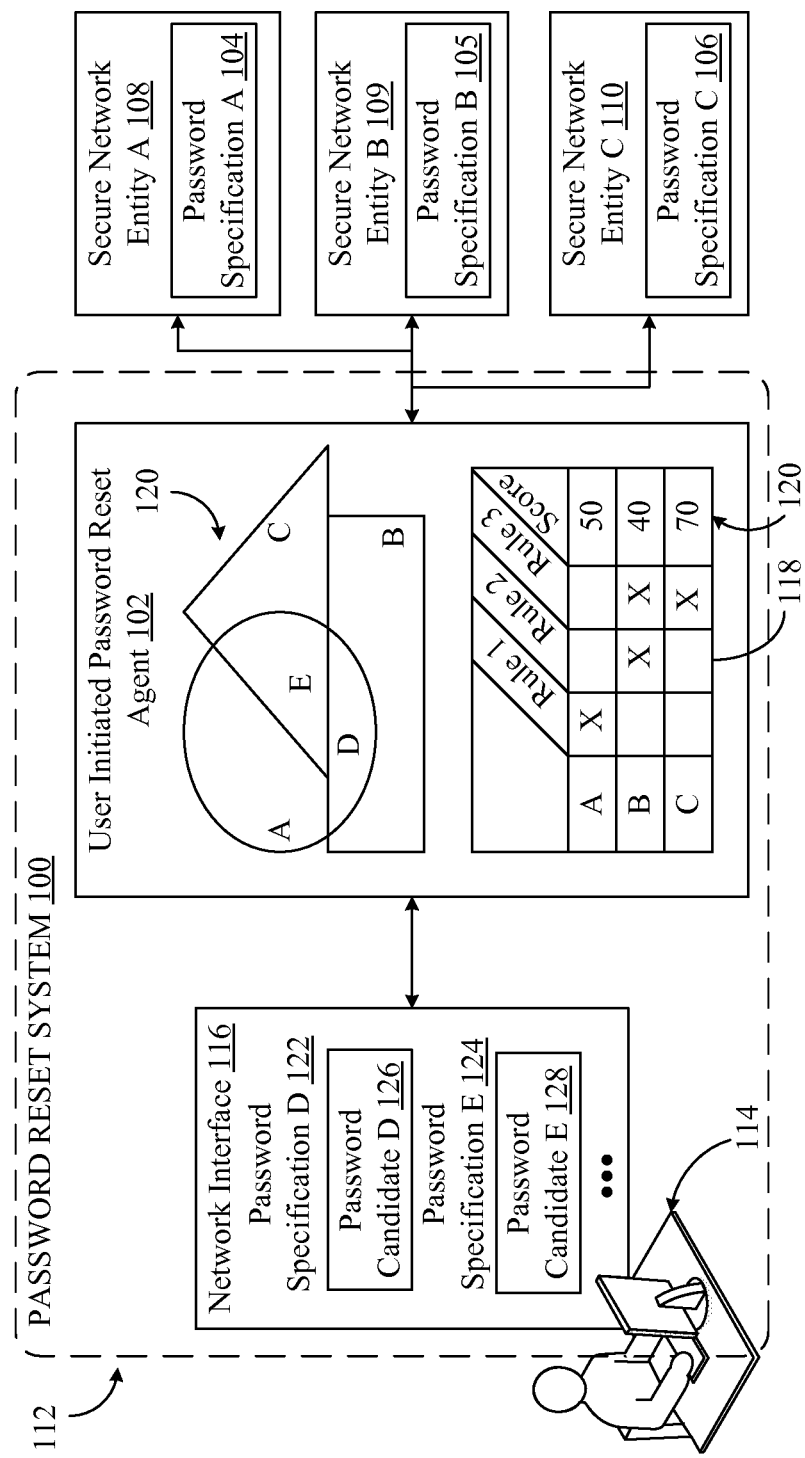
FIG. 1 illustrates a block diagram of a password reset system as part of networked system with multiple network entities requiring separate passwords of differing specifications.

A password reset system resets user passwords on a variety of network entities, such as internal systems, allowing simultaneous reset with a minimum number of user specified passwords that nonetheless satisfy the password specifications of these internal systems. Thereby, the user avoids the tedium of logging into each of these systems, changing their password, logging out, etc., for each system with the likelihood of creating unique passwords for each system that have to be remembered. By further incorporating a score metric based upon how many character sets are touched, a required degree of complexity can be measured and enforced against the password specifications. Advantageously, a table-based approach to enforcing password reset against the multiple password specifications facilitates making and fielding updates.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a password reset system 100 having a password reset agent 102 that acquires password specifications (A-C) 104-106 from secure network entities (A-C) 108-110 as part of a networked system 112. A user 114 accesses a network interface 116 to reset his passwords. The password reset agent 102 evaluates those password specifications in a password reset table 118 that are applicable, looking for an optimal aggregated password specification, which is graphically depicted at 120. If possible, the aggregated password specification satisfies all of the password specifications 104-106. In some instances, the optimal solution is more than one aggregated password specification, depicted as a password specification D 122 and a password specification E 124. Guided by feedback from the network interface 116, the user 114 is able to compose a password candidate D 126 and a password candidate E 128 as required to reset user passwords to the secure network entities 108-110.

In one aspect, each password specification A-C 104-106 and/or the aggregate password specification(s) 126, 128 can include a password complexity score 130 that services as a minimum compliance measure or as a measure for optimization. In an exemplary implementation, the score comprises a "touch score" related to the size of character set(s) required to be used by the password specification(s) 104-106, 124, 126. In a further exemplary implementation, a touch score reflects an adjustment for an increased length of password.

In an illustrative implementation, the password reset system 100 can be user initiated, and even limited from allowing automatic or administrator password suggestions to further enforce security procedures. Alternatively, the password reset system 100 can be a utility for customer center or other authorized personnel to generate passwords for a user.

Figure 2:
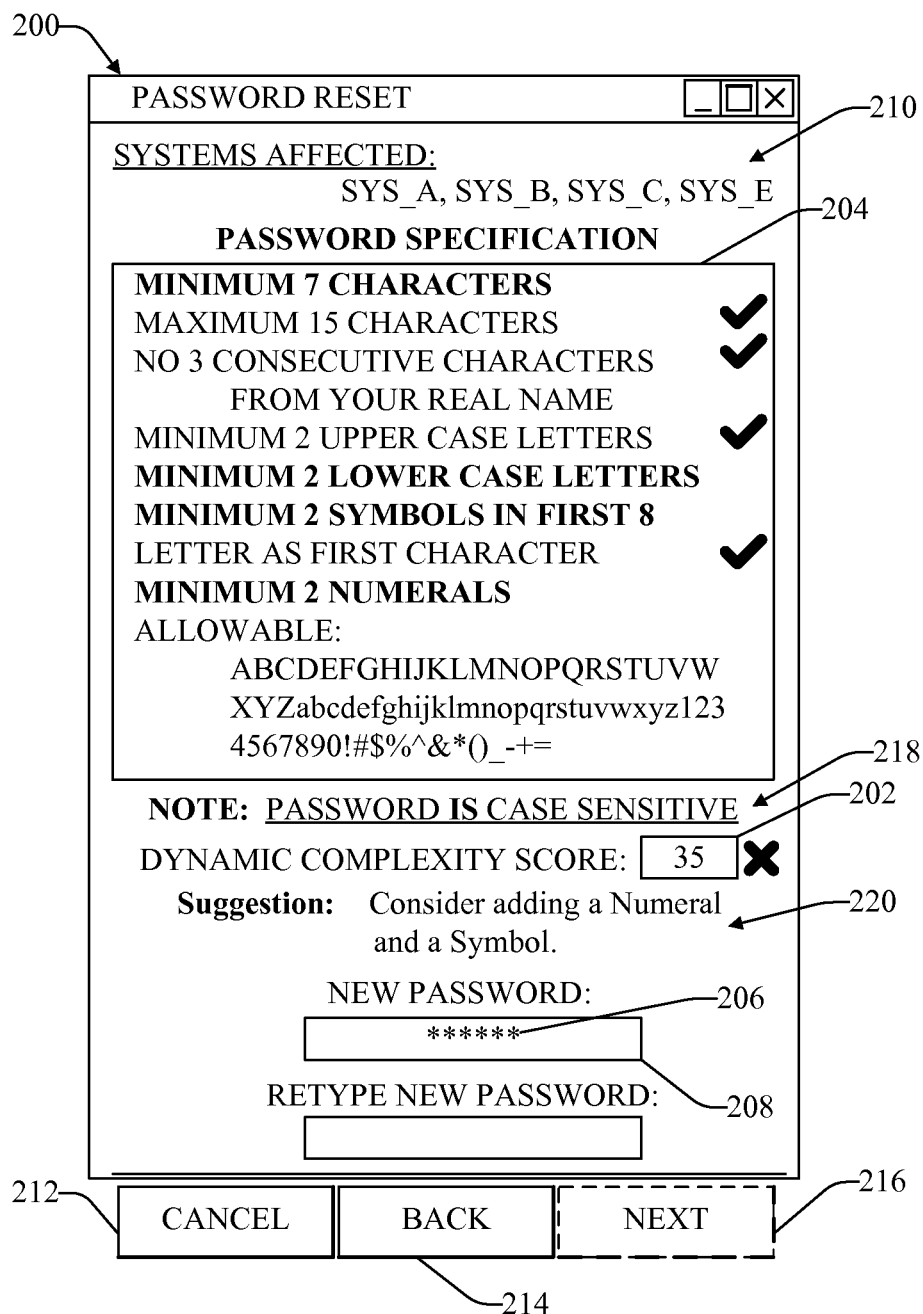
FIG. 2 illustrates a diagram of a window of network interface of the password reset system that provides a user prompting for generating a new password.

In FIG. 2, an illustrative window 200 for guiding a user to reset a password both provides a dynamic complexity score 202 as well as progressive feedback listing 204 regarding particular aggregated password specification rules that have been satisfied or not satisfied as the user inputs a proposed new password 206 in a new password data entry box 208. The window lists those systems whose passwords are to be reset by this operation, depicted at 210. The user can select a cancel button 212 to cancel the password reset operation or can select a back button 214 to return to an earlier screen (not shown). Once a password is entered that satisfies the password specification, a next button 216 becomes selectable by no longer being "grayed out". In this example, the progressive feedback listing 204 includes the following rules that have been satisfied at this point with six characters entered in box 208: "maximum 15 characters", "no three consecutive characters from your real name", minimum two upper case letters", "letter as first character", and has not violated a rule for allowable characters. At this point, the rules that have not been satisfied are indicated as "minimum seven characters", "minimum two lower case letters", and "minimum two symbols in first eight". The window 200 also provides a note depicted at 218 indicates whether the password specification is case sensitive or not, with the former being the case in the depicted example. Alternatively or in addition to progressive feedback listing 204, the window 200 can include a suggestion prompt 220 that guides the user to include a type of character that will increase the touch score. This suggestion prompt 220 can also guide the user into an optimal way to satisfy the remaining rules.

It should be appreciated that the password specification prompts can further highlight those rules that are violated in addition to those not yet satisfied. For example, entering a restricted symbol or exceeding a maximum length could result in a corresponding rule changing color to red as compared to black font for those not yet satisfied but that could yet be satisfied as the user continues to enter characters.

Figure 3:
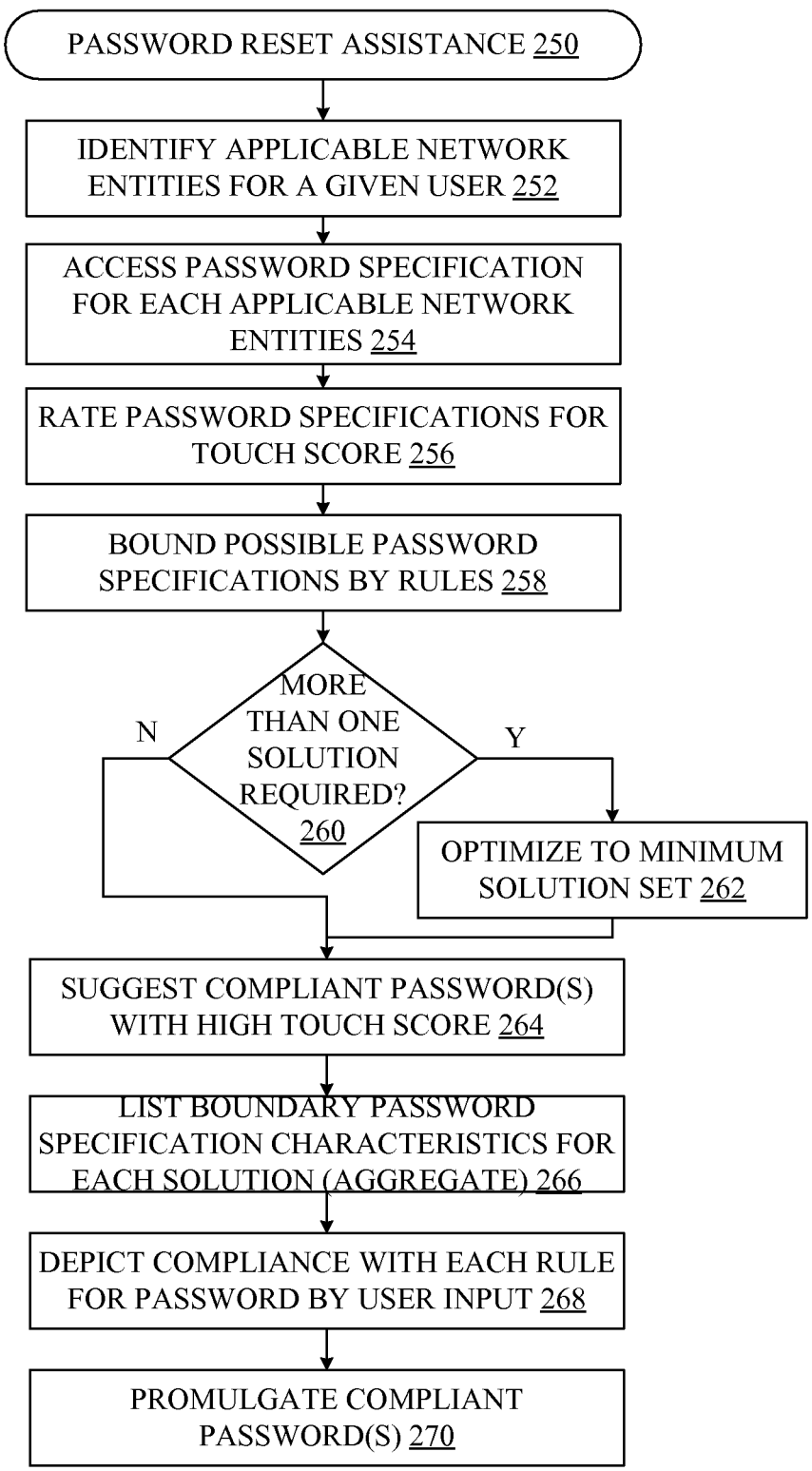
FIG. 3 illustrates a flow diagram of a password reset assistance methodology performed by the password reset system of FIG. 1.

In FIG. 3, a methodology 250 for providing password reset assistance includes identifying applicable network entity for a given user (block 252). The password specification rules are accessed for each of the applicable network entities (block 254). Each password specification is rated by touch score (block 256), which can be used to determine a least stringent password, can serve as one specification requirement, or serve as guidance to a user seeking to strengthen a password, or other purposes. The characteristics for the applicable password specifications are evaluated to bound possible password specifications (aggregation) (block 258). A determination is made as to whether more than one solution is required to reset all of the applicable passwords (block 260). If so, optimization is made against each group of network entities for achieve a minimum number of solution sets (block 262).

Thereafter, in some applications, an automated suggestion can be made for a unique password that is compliant and that has an advantageously high touch score (block 264). In other applications, it is procedurally precluded to suggest and/or display a password.

To assist the user, prompts are provided for entering a new password that will be compliant with the aggregated password specification (i.e., solution) (block 266). For example, each rule can be depicted in such a way as the user knows which rules are satisfied and which ones are not (block 268). In addition, the depiction can denote those rules that are violated and that thus require deleting some of the characters already entered. Once a compliant password is entered, then the password can be promulgated to the accessible systems to complete the password reset (block 270).

Figure 4:
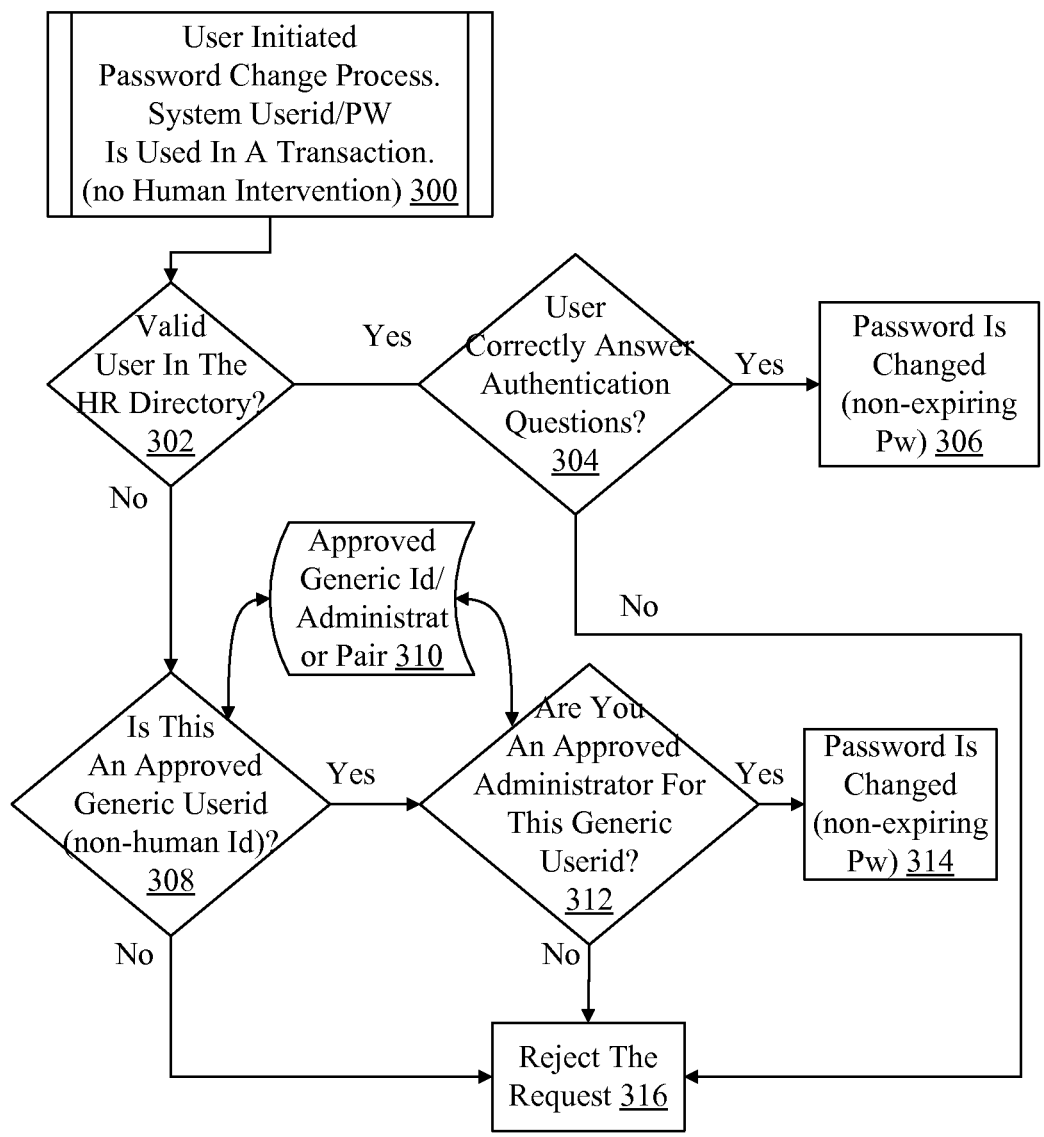
FIG. 4 illustrates a flow diagram of a methodology for user initiated password reset.

In FIG. 4, in some aspects password reset can be user initiated by a methodology 300 for a system user identification or password that is used in a transaction that requires no human interaction (e.g., automated) other than the inputs provided by a user. A determination is made as to whether there is a corresponding valid user in the human resources (HR) directory, or other management data structure (block 302). If so, then a determination is made as to whether the user has correctly answered an authentication question (block 304). If so, then the password is allowed to be changed, which can thus enable a non-expiring password (block 306). If in block 302 the user is not found in the directory, then a further determination is made as to whether the user identification entered is an approved generic userid (non-human id) (block 308). For example, there can be a separately approved generic identification/administrator pair (block 310). If so in block 308, then a further determination is made as to whether the approved generic userid is being used by an approved administrator authorized to use this generic userid (block 312). If so, the password is changed (non-expiring password) (block 314). If not an approved generic userid in block 308 or not approved administrator in block 312, then the request for password change is rejected (block 316).

Figure 5:
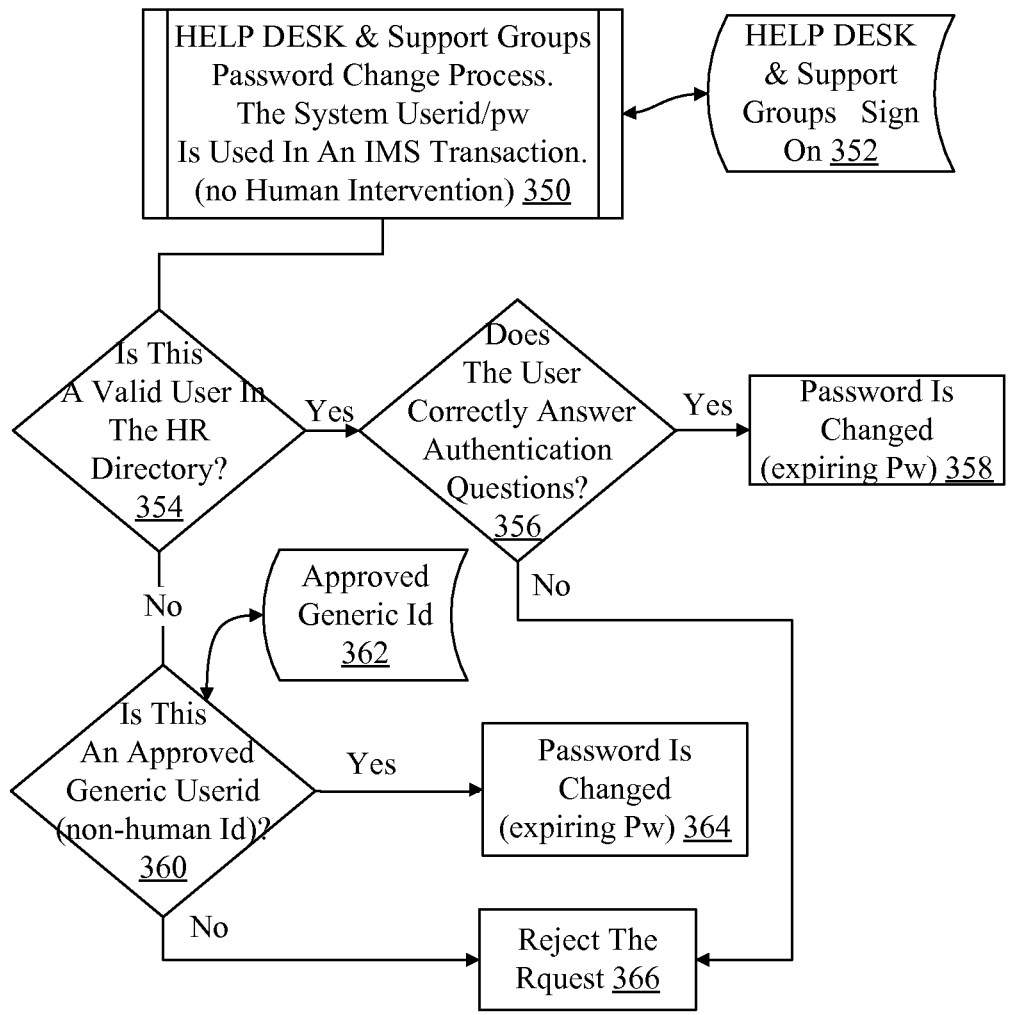
FIG. 5 illustrates a flow diagram of a methodology for administrator initiated password reset.

In FIG. 5, in another aspect, a methodology 350 for password reset by a customer service function (e.g., help desk, support group, etc.) is illustrated. The system userid/password is used in an information management system (IMS) transaction without human intervention. A determination is made as to whether the user is listed as a valid entry in an HR directory (block 354). If so, a further determination is made as to whether the user has correctly entered authentication questions (block 356). If so, the password can be changed as an expiring password that gives the user a limited opportunity to use the methodology 300 of FIG. 4 to create a non-expiring password (block 358).

If the user was not listed as a valid userid in the HR database in block 354, then a further determination as to whether what has been entered is an approved generic user identification (i.e., a non-human ID) (block 360), which can be verified against another data structure of approved generic identification (block 362). If approved in block 360, then the password is changed as an expiring password (block 364). If the user has not correctly entered authentication questions in block 356 or not an approved generic userid in block 360, then the request for a password reset is rejected in block 366.

Figure 6:
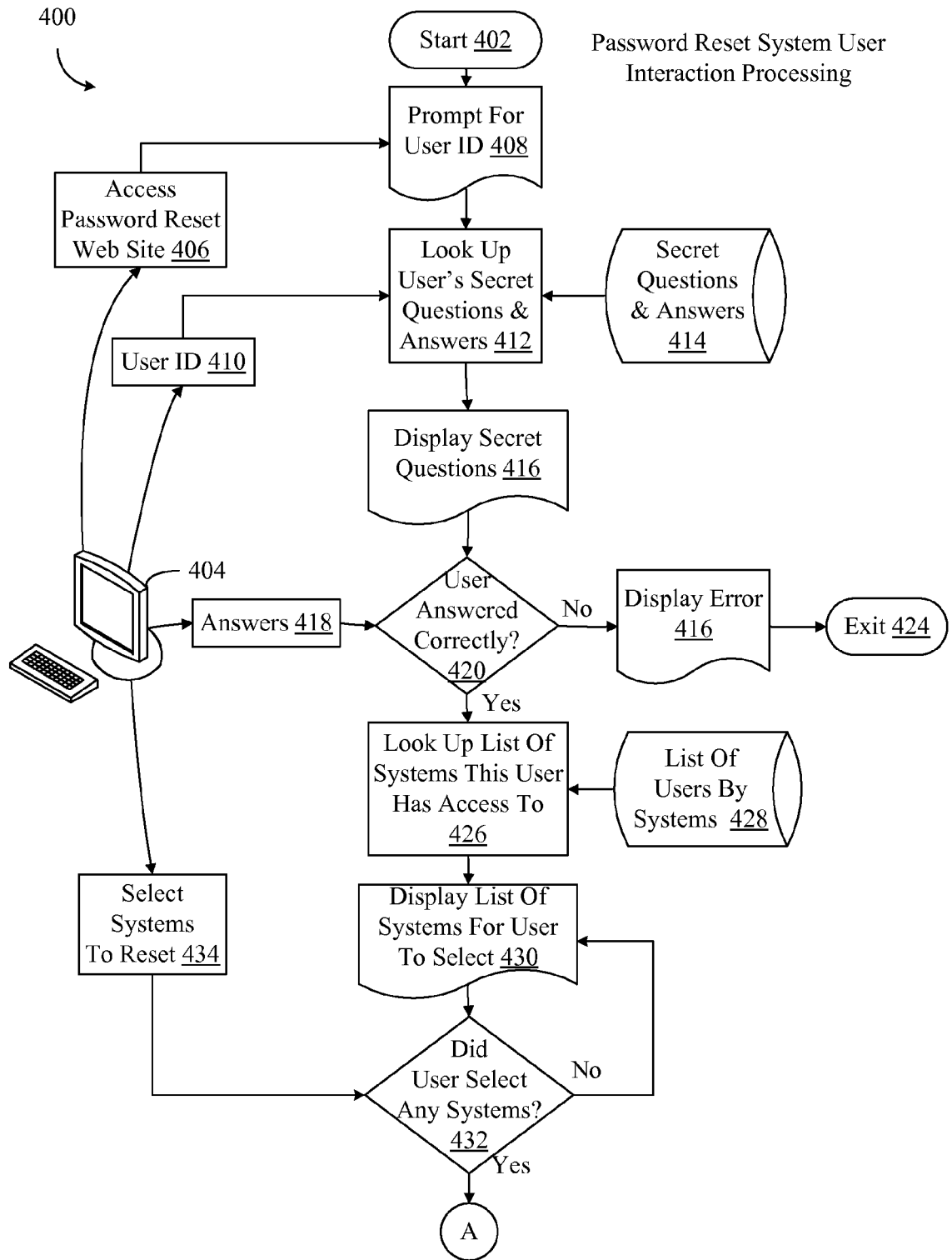
FIGS. 6-7 illustrate a flow diagram of a methodology for password reset system user interaction processing.

In FIG. 6, a process or methodology 400 is depicted for user interactive processing of a password reset system beginning with a start block 402. A user computer 404 accesses a password reset web site (block 406), which in turn provides a prompt for user ID (block 408). The user computer 404 in return responds with a user ID (block 410). In block 412, the process 400 looks up a user's secret questions and answers in a database 414. The secret questions are displayed (block 416), to which the user computer 404 responds with answers 418. A determination is made as to whether the user answered correctly (block 420). If not, then the error is displayed in block 422 and the process exits in block 424. If correct in block 420, the list of systems is looked up for the user (block 426). Advantageously, this list can be filtered to those to which the user is entitled to access by referencing a database of authorized users by system (block 428). This list is displayed for the user to select from (block 430). A determination is made as to whether the user has selected any systems (block 432), which are depicted at 434 as being received from user computer 404. If not received, processing returns to block 430.

Figure 7:
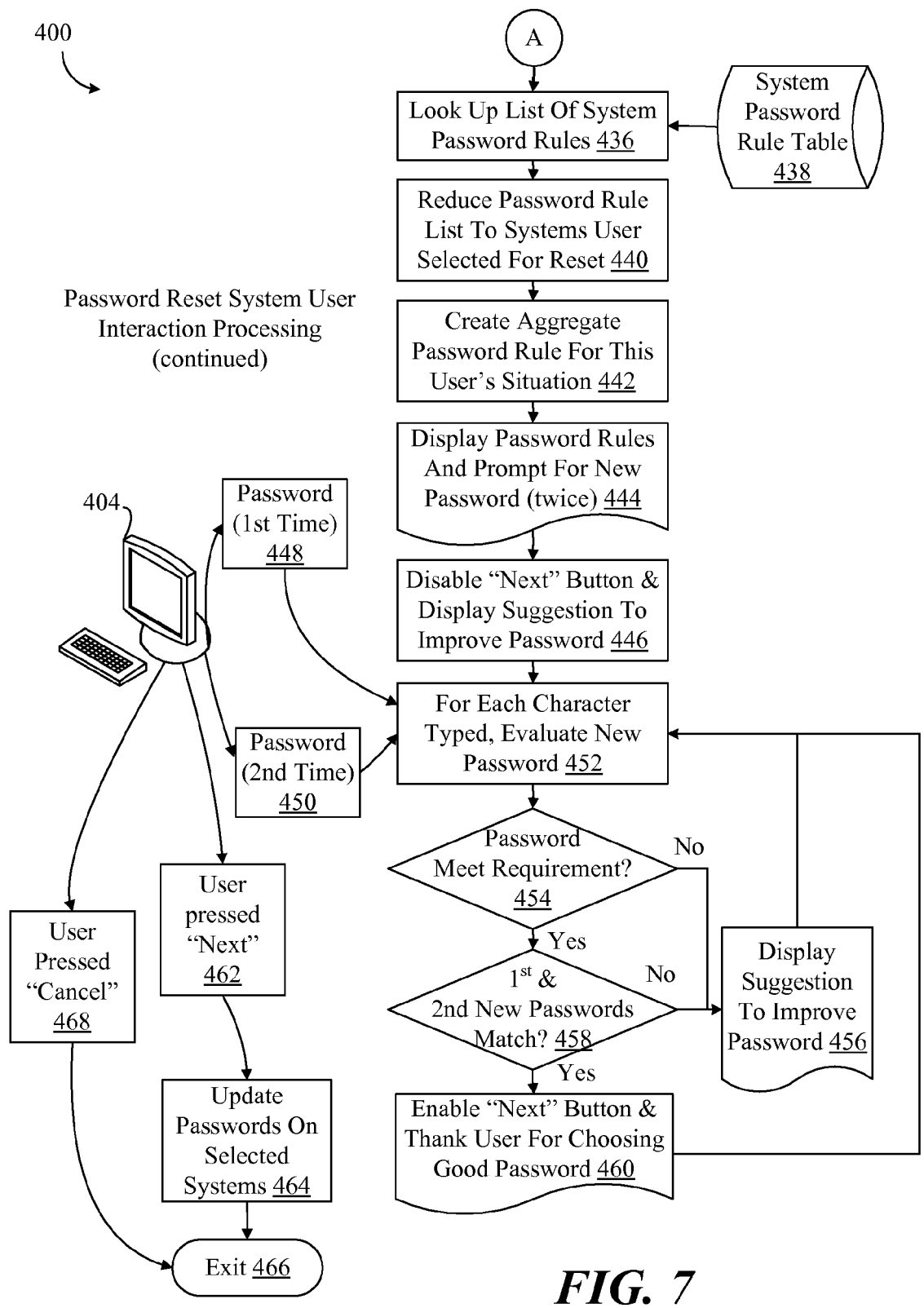

In FIG. 7, the methodology 400 continues if the determination in block 432 is that the user has selected system(s), then the password rules (i.e., specifications) are looked up for the list of systems applicable and selected (block 436) as perhaps located in a system password rule table 438. Then, the list of password rules are reduced just to those selected for reset (block 440). The filtered list is aggregated for this user's situation (block 442). The aggregated password rules are displayed and a prompt is given for an entry of a new password and repeated password entry for confirmation (block 444). A "next" button is disabled until the password is correctly entered and guidance is displayed to assist in creating the new password (block 446). The user computer 404 is used to enter the first time password entry (block 448) and the second time password entry (block 450). As each character is typed, the new password is evaluated (block 452). A determination is made is the password as entered meets the aggregate requirements (block 454). If not, then a suggestion is displayed for improving the password 456 and processing returns to block 452. If so in block 454, then a further determination is made as to whether the first and second time passwords match (block 458). If not, then processing proceeds to block 456 to display a suggestion. If matching in block 458, then the "next" button is enabled and the user is thanked for choosing a good password (block 460) and processing returns to block 452 to see if the user wants to proceed or repeat any of this process. If the user computer 404 indicates selection of the "next" button (block 462), then the passwords are updated on the selected systems (block 464) and the process exits (block 466). If during the process the user computer 404 indicates selection of the "cancel" button (468), then the process exits (block 466).

Figure 8:
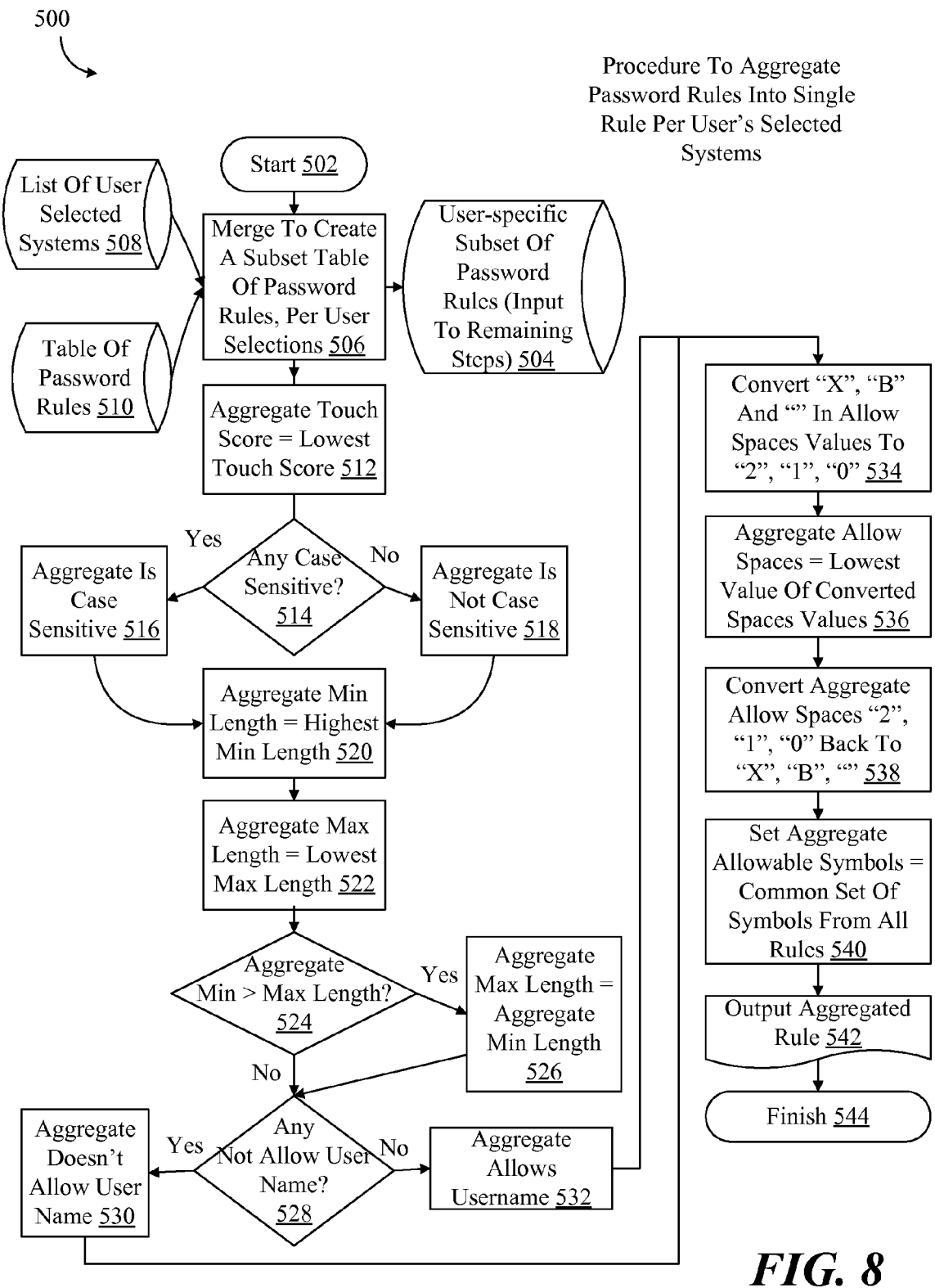
FIG. 8 illustrates a flow diagram for a methodology for aggregating password rules into a single rule (specification) for the user's selected and/or accessible systems.

In FIG. 8, a process or methodology 500 for aggregating password rules into a single rule (specification) per the user's selected or authorized systems is depicted beginning at a start (block 502). The records in the table are merged to create a subset table 504 of password rules per user selection (block 506). This merging can benefit from a data structure (e.g., list) 508 of user selected systems, a data structure (e.g., table) 510 of password rules for these systems. An aggregate touch score is determined as being the lowest touch score that satisfies the subset table 504 (block 512). A determination is made as to whether any of the password specifications in the subset table 504 are case sensitive (block 514). If so, then the aggregate is case sensitive as well (block 516), else the aggregate is not case sensitive (block 518). Then an aggregation is made for a characteristic of minimum password length, with the highest minimum length requirement becoming the aggregate minimum length requirement (block 520). Then an aggregation is made for a characteristic of maximum password length, with the lowest maximum length becoming the aggregate maximum length (block 522). A determination is made as to whether the aggregate minimum length is greater than the maximum length (block 524). If so, then the aggregate maximum length is set to the aggregate minimum length (block 526). Alternatively, more than one solution will be presented for the user, which can address situations in which certain systems cannot accept a password outside of specified range and an intermediary is not available to interface a conforming password to this particular system (not depicted).

A determination is made as whether or not any of the password specifications preclude the use a predetermined segment length of the user name (block 528). If so, the aggregate will include a characteristic that the predetermined segment length of the user name is not allowed (block 530) and otherwise this aggregate characteristic is set to allow such use (block 532). To accommodate rules regarding case sensitivity and allowance of spaces, in the illustrative process the characteristic codes for "X", "B" and null (" ") are converted respectively to "2", "1" and "0" (block 534). The aggregate rule for allow spaces is set to the lowest value of converted space values (block 536). Then, the aggregate code for allow spaces is converted back to the corresponding value (e.g., "2" to "X", "1" to "B", and "0" to null) (block 538). The aggregate characteristic for allowable symbols is set equal is set to the intersection (common) set of symbols from all rules (block 540). The aggregate rule is then output (block 542) and the process is finished (block 544).

As an alternative to the specifications regarding allowing spaces, the aggregate can substitute an allowed character (e.g., symbol) for spaces, regardless of embedded, leading, or trailing), is to simply include it as another allowed symbol. This would increase the touch score value for symbols for systems that allow spaces.

To give an illustration, consider Table 1 as an exemplary sample of a table of system password specifications:

TABLE 1

| System | Min Touch Score | Case Sensitive | Min Length | Max Length | Not User Name | Allow Spaces | Allowable Symbols |
|---|---|---|---|---|---|---|---|
| Benefits | 10 | X | 6 | 10 | | | !@#$%^&*(),./;[ ]\=_+\|{:?><~ |
| FileNet | 10 | X | 6 | 8 | | | !@#$%^&*(),./;' [ ]\ =_+\|{":?><~ |
| Harvest | 10 | X | 6 | 8 | | | !@#$%^&*(),./;' [ ]\ =_+\|{":?><~ |
| Keon | 10 | X | 7 | 8 | | | !%^&*(),./;'[]\ =_+\|{":?>< |
| MicroStrategy | 36 | X | 6 | 8 | | | @#$ |
| Novell NDS | 10 | | 6 | 24 | | E | !@#$%^&*(),./;' [ ]\ =_+\|{":?><~ |
| OFX | 10 | X | 8 | 14 | | | !#$%&*(),/; =_+":?>< |
| Oracle databases | 10 | | 6 | 30 | | | !"#$%&()`*+,/:;<=>?_ |
| Oscar | 10 | | 5 | 14 | | | !@#$%^&*(),./;' [ ]\ =_+\|{":?><~ |
| Payroll | 15 | X | 8 | 40 | X | | !@#$% |
| RACF Mainframe | 62 | | 7 | 8 | | | @#$ |
| Sybase databases | 36 | | 7 | 30 | | | !"#$%&()`*+,/:;<=>?_ |
| TeraData | 10 | X | 7 | 25 | | | !@#$%^&*(),./;' []\=_+\|{:?><~ |
| TESS | 62 | | 6 | 10 | | | |
| Windows Active Directory | 62 | X | 7 | 127 | X | E | !@#$%^&*(),./;' [ ]\ =_+\|{":?><~ |
| Windows NT | 10 | X | 7 | 14 | | E | !@#$%^&*(),./;' [ ]\ =_+\|{":?><~ |

The columns in Table 1 have the following definitional meanings as given in Table 2:

TABLE 2

| | |
|---|---|
| System | The name of the system and its associated password rules. |
| Minimum Touch Score | Described below. |
| Case Sensitive | An "X" indicates that a system treats upper and lower case alphabetic as different. For example, "A" is different than "a". If the column entry is blank, then that system considers "A" to be equivalent to "a". |
| Min Length | Minimum password length (in characters) required by each system. Note that this may be set as a company's policy, and not technical limit. For example, the Payroll system's minimum technical password limit might be 4 characters, however, the information security department decided to |

TABLE 2-continued

| | |
|---|---|
| | enforce a minimum of 8 characters. A minimum of 0 implies that no password is required. |
| Max Length | Maximum password length (in characters) required by each system. Must be greater to or equal to Min Length. This is almost always a technical limit imposed by the systems that accept and process passwords. |
| Not User Name | The password cannot contain the username. |
| Allow Spaces | Blank indicates the system does not allow any spaces in passwords. An "E" indicates that spaces are allowed anywhere within the password, except for the first and last positions (embedded only, no leading/trailing spaces). An "X" indicates that spaces are allowed anywhere within the password, including the first/last characters. |
| Allowable Symbols | All systems allow the alphabetic characters (A through Z; and a through z), plus numeric (0 through 9) within passwords. This column indicates the additional characters also permitted by this system. |

The touch score rates the number of character sets a given situation "touches". For example, the letter "a" touches the lower case character set (of 26 possibilities); and similarly, "a1" touches both lower case and number character sets (of 36 possibilities).

The characters in a password fall into the four primary groups:
  26 Upper case letters, A-Z
  26 Lower case letters, a-z
  10 Digits, 0-9

A variable number of special symbols, such as "!@#$" The highest possible touch score is the sum of all of the possible characters. For example, if a system allows mixed case alphabetic and numeric passwords, but no symbols, the highest possible touch score would be 62 (26+26+10). In another example, if a system allows mixed case alphabetic, numeric and the 4 symbols "!@#$", the highest possible touch score is 66 (26+26+10+4).

A given password's touch score is the sum of the characters in each group used by the password. For example, the password "cat" has a score of 26, since it only contains characters from the group of 26 lower case characters. Similarly, "cAt" has a score of 52, ("c" and "t" from the 26 lower case characters+"A" from the 26 upper case). And, so on:
  "cat"=26
  "cAt"=52
  "cat1"=36
  "cAt1"=62
  "cat#"=30
  "cAt#1"=66

If a given system allows more symbols, the touch score value for the symbols goes up. For example, assume a system allows the 11 symbols "!@#$%&+=(?)", then the above touch scores become:
  "cat"=26
  "cAt"=52
  "cat1"=36
  "cAt1"=62
  "cat#"=37
  "cAt#1"=73

The table's "Min Touch Score" value specifies each system's minimum touch score requirement for passwords. Although not obvious, minimum touch score conveys the password character set requirements for a given system. For example, if a system requires an alpha+numeric password, then the minimum touch score would be 36 (26 either upper or lower case+10 numeric).

If a given system is not case sensitive, then touch scores for either upper or lower case characters are combined into 52 (26 upper+26 lower). So, the passwords "cat", "CAT", and "cAt" all have a value of "52".

For systems that are not case sensitive, the minimum touch score requirement is increased to compensate for the fact that upper+lower case have been combined. So, if a non-case sensitive system requires an alpha+numeric password, the minimum touch score would be 62 (52 alpha+10 numeric).

Security professionals sometimes recommend that Microsoft Windows systems be configured with a password rule that states passwords must contain 3 out of the 4 possible character sets. The minimum touch score for those systems considers which is the smallest set of characters that could meet that requirement. Since Windows allows 31 special symbols, 26 upper case, 26 lower case and 10 numeric, the touch value using the smallest 3 out of the 4 is 62 (26+26+10). So, if a password of "A1#" is selected, its value is 67 (26+10+31) exceeds the minimum requirement.

Aggregating: When a user needs to select a password that meets the combined requirements of several systems, the following rules of Table 3 illustrate one aspect for how to combine the rows in the password table into a single rule (row)

TABLE 3

| Element | How to aggregate |
|---|---|
| Min Touch Score | Use the highest score from the selected rows. |
| Case Sensitive | If any selected row is case sensitive, then the aggregate is also case sensitive. |
| Min Length | Use the highest Min Length value from the selected rows. |
| Max Length | Use the lowest Max Length value from the selected rows. |
| Not User Name | If any selected row does not permit user name within password, then the aggregate also does not permit it. |
| Allow Spaces | The easiest way to aggregate this field is by assigning numeric values to each possible entry: 0 = No spaces allowed, 1 = Embedded spaces allowed, 2 = Spaces allowed anywhere in password (including leading/trailing). Then, use the smallest value from the selected rows. |
| Allowable Symbols | Use the character symbols that are common to the selected rows. |

In some implementations, a decision may be made to determine what happens if the highest Min Length value is greater than the lowest Max Length value. For example, one would expect that a high Min value would override a low Max value.

As an example, consider a user that wants to reset their password on multiple systems: Benefits, Payroll and Windows Active Directory in Table 4:

TABLE 4

| System | Min Touch Score | Case Sensitive | Min Length | Max Length | Not User Name | Allow Spaces | Allowable Symbols |
|---|---|---|---|---|---|---|---|
| Benefits | 10 | X | 6 | 10 | | | !@#$%^&*(),./:[ ]\=_+|}{:?><~ |
| Payroll | 15 | X | 8 | 40 | X | | !@#$% |
| Windows Active Directory | 62 | X | 7 | 127 | X | E | !@#$%^&*(),./:'[ ]\=_+|}{":?><~ |
| Aggregated Rule | 62 | X | 8 | 10 | X | | !@#$% |

In Table 5, sample passwords scored against above Table 4:

TABLE 5

| Password | Touch Score | Acceptable? |
|---|---|---|
| cat | 26 | No, too short, low touch score |
| catsdogs | 26 | No, low touch score |
| catsdog$ | 31 | No, low touch score |
| cat4dogs | 36 | No, low touch score |
| cat4dog$ | 41 | No, low touch score |
| Catsdogs | 52 | No, low touch score |
| Catsdog$ | 57 | No, low touch score |
| Cat4dogs | 62 | Yes |
| Cat4dog$ | 67 | Yes |

Consider another user has access to RACF Mainframe, TESS and Windows NT in Table 6:

TABLE 6

| System | Min Touch Score | Case Sensitive | Min Length | Max Length | Not User Name | Allow Spaces | Allowable Symbols |
|---|---|---|---|---|---|---|---|
| RACF Mainframe | 62 | | 7 | 8 | | | @#$ |
| TESS | 62 | | 6 | 10 | | | |
| Windows NT | 10 | X | 7 | 14 | | E | !@#$%^&*(),./:'[ ]\-=_+|}{":?><~ |
| Aggregated Rule | 62 | X | 7 | 8 | | | |

Sample passwords in Table 7 scored against above Table 6:

TABLE 7

| Password | Touch Score | Acceptable? |
|---|---|---|
| cat | 26 | No, too short, low touch score |
| catsdogs | 26 | No, low touch score |
| catsdog$ | 26 | No, "$" not permitted |
| cat4dogs | 36 | No, low touch score |

TABLE 7-continued

| Password | Touch Score | Acceptable? |
|---|---|---|
| cat4dog$ | 36 | No, "$" not permitted |
| Catsdogs | 52 | No, low touch score |
| Catsdog$ | 52 | No, "$" not permitted |
| Cat4dogs | 62 | Yes |
| Cat4dog$ | 62 | No, "$" not permitted |

Yet another user only has access to RACF Mainframe and TESS. Note that since the aggregated rule is not case sensitive, each alphabetic character carries a touch score of 52, regardless of case in Table 8:

TABLE 8

| System | Min Touch Score | Case Sensitive | Min Length | Max Length | Not User Name | Allow Spaces | Allowable Symbols |
|---|---|---|---|---|---|---|---|
| RACF Mainframe | 62 | | 7 | 8 | | | @#$ |
| TESS | 62 | | 6 | 10 | | | |

TABLE 8-continued

| System | Min Touch Score | Case Sensitive | Min Length | Max Length | Not User Name | Allow Spaces | Allowable Symbols |
|---|---|---|---|---|---|---|---|
| Aggregated Rule | 62 | | 7 | 8 | | | |

Sample passwords in Table 9 are scored against above Table 8:

TABLE 9

| Password | Touch Score | Acceptable? |
|---|---|---|
| cat | 52 | No, too short, low touch score |
| catsdogs | 52 | No, low touch score |
| catsdog$ | 52 | No, "$" not permitted |
| cat4dogs | 62 | Yes |
| cat4dog$ | 62 | No, "$" not permitted |
| Catsdogs | 62 | Yes |
| Catsdog$ | 62 | No, "$" not permitted |
| Cat4dogs | 62 | Yes |
| Cat4dog$ | 62 | No, "$" not permitted |

And, another user has access to Novell NDS and Windows NT in Table 10:

TABLE 10

| System | Min Touch Score | Case Sensitive | Min Length | Max Length | Not User Name | Allow Spaces | Allowable Symbols |
|---|---|---|---|---|---|---|---|
| Novell NDS | 10 | | 6 | 24 | | E | !@#$%^&*(),./;'[]\=_-+|}{":?><~ |
| Windows NT | 10 | X | 7 | 14 | | E | !@#$%^&*(),./;'[]\=_-+|}{":?><~ |
| Aggregated Rule | 10 | X | 7 | 14 | | E | !@#$%^&*(),./;'[]\=_-+|}{":?><~ |

In Table 11, sample passwords are scored against above Table 10:

TABLE 11

| Password | Touch Score | Acceptable? |
|---|---|---|
| cat | 26 | No, too short |
| catsdogs | 26 | Yes |
| catsdog$ | 58 | Yes |
| cat4dogs | 36 | Yes |
| cat4dog$ | 68 | Yes |
| Catsdogs | 52 | Yes |
| Catsdog$ | 84 | Yes |
| Cat4dogs | 62 | Yes |
| Cat4dog$ | 94 | Yes |

As an extreme case in Table 12, someone with access to every system has the following password specification:

TABLE 12

| System | Min Touch Score | Case Sensitive | Min Length | Max Length | Not User Name | Allow Spaces | Allowable Symbols |
|---|---|---|---|---|---|---|---|
| Benefits | 10 | X | 6 | 10 | | | !@#$%^&*(),./;'[]\=_-+|}{:?><~ |
| FileNet | 10 | X | 6 | 8 | | | !@#$%^&*(),./;'[]\=_-+|}{":?><~ |
| Harvest | 10 | X | 6 | 8 | | | !@#$%^&*(),./;'[]\=_-+|}{":?><~ |
| Keon | 10 | X | 7 | 8 | | | !%^&*(),./;'[]\=_-+|}{":?>< |
| MicroStrategy | 36 | X | 6 | 8 | | | @#$ |
| Novell NDS | 10 | | 6 | 24 | | E | !@#$%^&*(),./;'[]\=_-+|}{":?><~ |
| OFX | 10 | X | 8 | 14 | | | !#$%&*(),/;=_-+":?>< |
| Oracle databases | 10 | | 6 | 30 | | | !"#$%&()`*+./:;<=>?_ |
| Oscar | 10 | X | 5 | 14 | | | !@#$%^&*(),./;'[]\=_-+|}{":?><~ |
| Payroll | 15 | X | 8 | 40 | | X | !@#$% |

TABLE 12-continued

| System | Min Touch Score | Case Sensitive | Min Length | Max Length | Not User Name | Allow Spaces | Allowable Symbols |
|---|---|---|---|---|---|---|---|
| RACF Mainframe | 62 | | 7 | 8 | | | @#$ |
| Sybase databases | 36 | | 7 | 30 | | | !"#$%&()`*+,./:;<=>?_ |
| TeraData | 10 | X | 7 | 25 | | | !@#$%^&*(),./;'[ ]\ =_+|}{":?><~` |
| TESS | 62 | | 6 | 10 | | | |
| Windows Active Directory | 62 | X | 7 | 127 | X | E | !@#$%^&*(),./;'[ ]\ =_+|}{":?><~` |
| Windows NT | 10 | X | 7 | 14 | | E | !@#$%^&*(),./;'[ ]\ =_+|}{":?><~` |
| Aggregated Rule | 62 | X | 8 | 8 | X | | |

In Table 13, sample passwords are scored against above Table 12:

TABLE 13

| Password | Touch Score | Acceptable? |
|---|---|---|
| cat | 26 | No, too short, low touch score |
| catsdogs | 26 | No, low touch score |
| catsdog$ | 26 | No, "$" not permitted |
| cat4dogs | 36 | No, low touch score |
| cat4dog$ | 36 | No, "$" not permitted |
| Catsdogs | 52 | No, low touch score |
| Catsdog$ | 52 | No, "$" not permitted |
| Cat4dogs | 62 | Yes |
| Cat4dog$ | 62 | No, "$" not permitted |

As another aspect, a password dictionary can be utilized to screen for words in various languages as well as common names for people, cities, sports teams, profanity, etc., that are commonly used, and thus likely to be tried by hackers seeking to infiltrate a system. If a user's desired password is found within the dictionary, the password can be rejected. Checks can be made for variants of the user's desired password, such as spelled backwards, various upper/lower case combinations, a single digit appended/pre-pended, etc., to enforce a desired complexity over and above merely a touch score.

Adjusting Touch Scores Based on Password Length: There are indications that a longer, albeit less-complex, password (i.e., lower touch score) is more secure than a shorter, albeit more-complex, (i.e., higher touch score) password. Because of these indications, adjusting the touch score based on password length can have benefits. The intent is to "reward" the user that selects a very long password.

A variety of formulas can skew the touch score based on password length. One illustrative method uses the formula:

$$AdjustedTouchScore = (TouchScore \times PasswordLength) / MinPasswordLength.$$

So, for example, assume that a scenario's Min Length value is 7, and Min Touch Score is 36 (case sensitive), the following password scores would result:

"saints"=26×(6/7)=22
"saintsi"=26×(7/7)=26
"saintsig"=26×(8/7)=29
"saintsigl"=26×(9/7)=33
"saintsiglo"=26×(10/7)=37
"saintsigloo"=26×(11/7)=40

Note that even though the raw touch score is always 26 (not meeting the 36 alpha+numeric requirement), the long 10 and 11 character passwords make up for the lack of complexity.

Personal Information in Password (Username, Name): In the illustrative descriptions above, determinations were made as to whether segments of a user's name could be used. It is further contemplated that these proscriptions can be extended to other values that can be independently associated with the user (e.g., address, zip code, phone number, or any other personally identifiable information).

To accommodate embedded-only passwords, simply remove the leading/trailing spaces before testing the password. This has the effect of reducing a password's length, without affecting scoring for embedded spaces.

Other Special Password Attribute: Although not described in the above text, it is possible to add other password attributes and determine how to aggregate them. For example, some systems might not allow repeating characters within a password, so a new table column could be added to note this requirement, and the aggregated password rule would enforce the requirement if any selected system needed it.

Numeric-only passwords (VRUs): In other aspects, an implementation can use only numeric-only passwords, where scores would tend to be lower (10 for digits, 2 for special symbols "*#" on telephone keypad). This would be useful for Voice Response Unit (VRU) situations.

Per-Position Character Sets: For clarity, the illustrative version describes the character sets available to the entire password. However, some systems might have special requirements for certain character positions within the password. For example, a system might require that the first character within a password be alphabetic, and the remaining characters can be alpha, numeric and some symbols. To accommodate this situation, the table can have separate character sets for each character position, or, separate character sets for the first, last and in-between characters in order to provide additional functionality.

Figure 9:
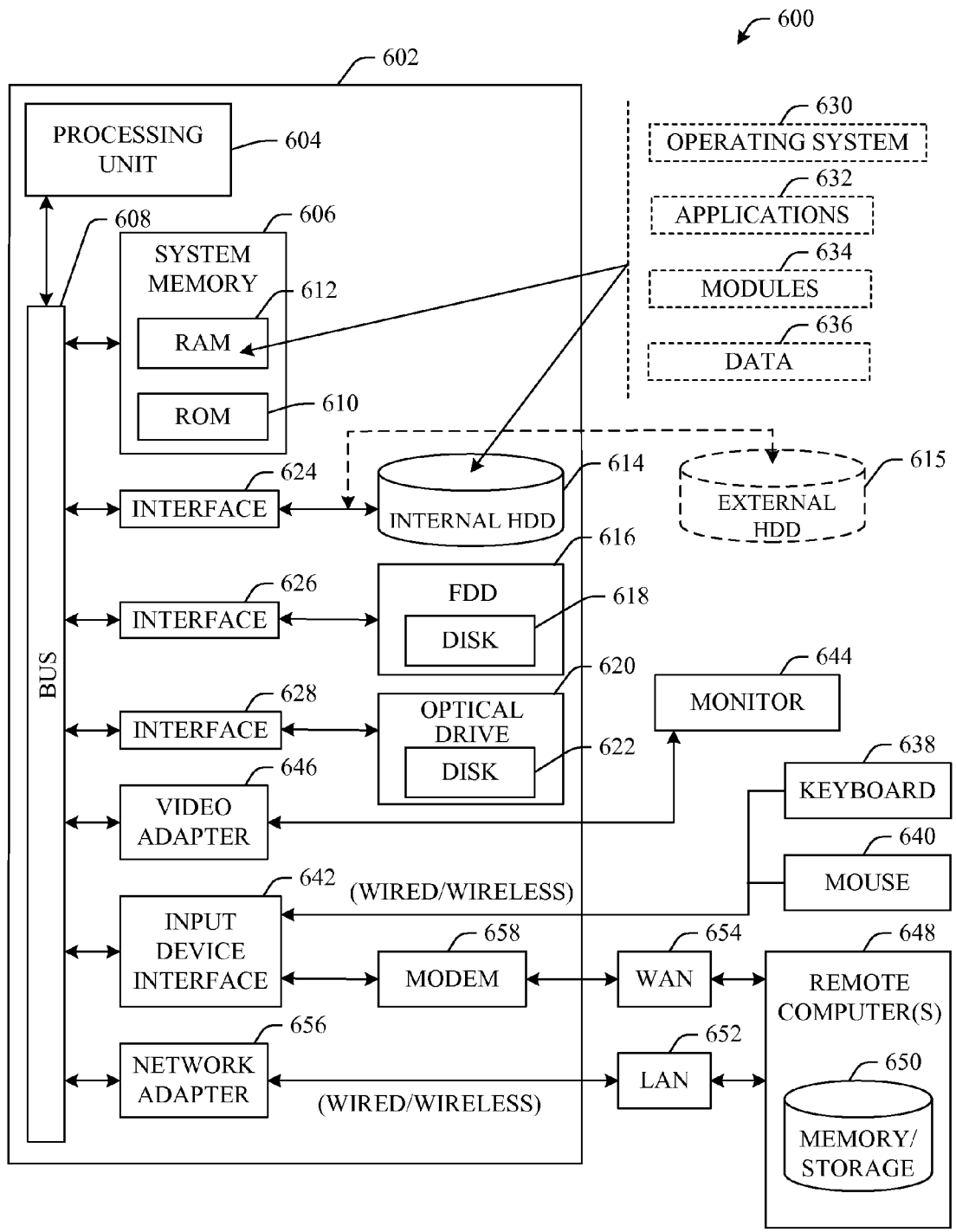
FIG. 9 illustrates a brief general description of a suitable computing environment wherein the various aspects of the subject innovation can be implemented.

With reference again to FIG. 9, the exemplary environment 600 for implementing various aspects of the innovation includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA). Alternatively or in addition, an external hard disk drive 615 may also be configured for external use in a suitable chassis (not shown), a magnetic disk drive, depicted as a floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drives 614, 615 magnetic disk drive 616 and optical disk drive 620 can be connected to the system bus 608 by a hard disk drive interface 624, a magnetic disk drive interface 626 and an optical drive interface 628, respectively. The interface 624 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and system memory 606, including an operating system 630, one or more application programs 632, other program modules 634 and program data 636. All or portions of the operating system, applications, modules, and/or data can also be cached in the RAM 612. It is appreciated that the innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, depicted as remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642 as depicted. It should be appreciated that the modem 658 can be connected via a USB connection, a PCMCIA connection, or another connection protocol. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet).

Figure 10:
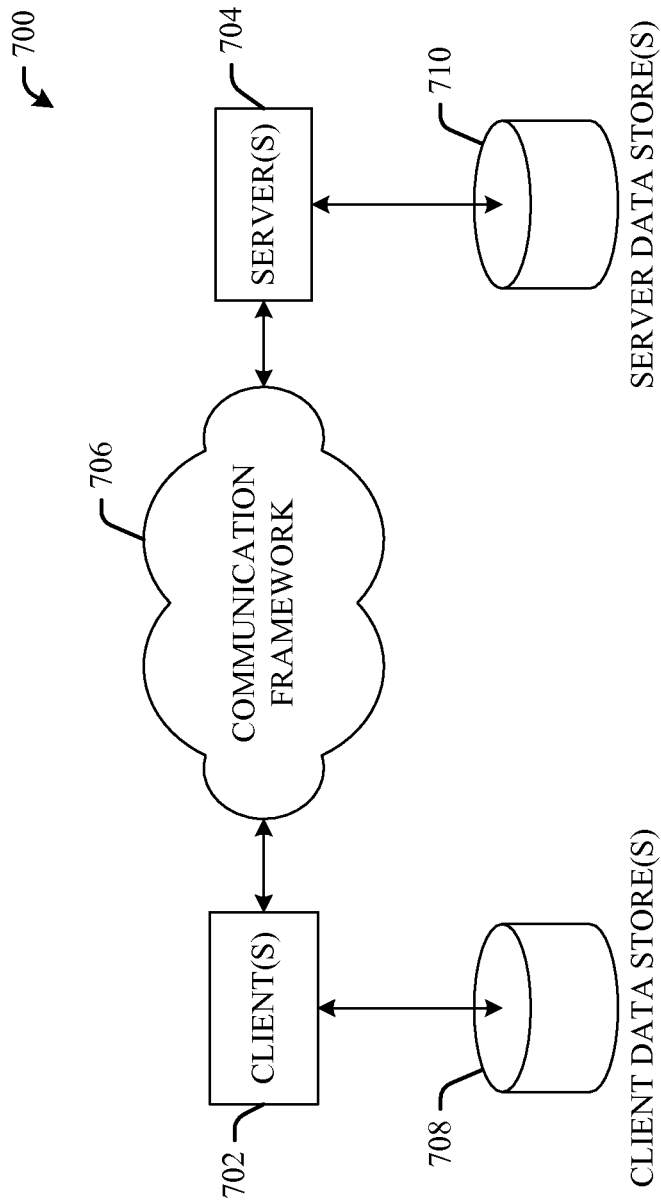
FIG. 10 illustrates a schematic diagram of a client-server-computing environment wherein the various aspects of the subject innovation can be implemented.

FIG. 10 is a schematic block diagram of a sample-computing environment 700 that can be employed for practicing aspects of the afore-mentioned methodology. The system 700 includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). The servers 704 can house threads to perform transformations by employing the components described herein, for example. One possible communication between a client 702 and a server 704 may be in the form of a data packet adapted to be transmitted between two or more computer processes. The system 700 includes a communication framework 706 that can be employed to facilitate communications between the client(s) 702 and the server(s) 704. The client(s) 702 are operatively connected to one or more client data store(s) 708 that can be employed to store information local to the client(s) 702. Similarly, the server(s) 704 are operatively connected to one or more server data store(s) 710 that can be employed to store information local to the servers 704.

What has been described above includes examples of the various versions. It is, of course, not possible to describe every conceivable combination of components or methodologies for purposes of describing the various versions, but one of ordinary skill in the art may recognize that many further combinations and permutations are possible. Accordingly, the subject specification intended to embrace all such alterations, modifications, and variations that fall within the spirit and scope of the appended claims.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the aggregation of password rules can infer or predict support or the degree of parallelism provided by a machine based on previous interactions with the same or like machines under similar conditions. As another example, touch scoring can adapt to hacker patterns to adjust scoring to thwart successful approaches.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for guiding a user to simultaneously reset a plurality of passwords, comprising:
    storing computer executable instructions on a memory;
    employing a processor that executes the computer executable instructions stored on the memory to implement the following acts:
    accessing a first password specification for a first network entity, wherein the first password specification comprises a first set of rules that each valid password for the first network entity must comply with;
    accessing a second password specification for a second network entity, wherein the second password specification comprises a second set of rules that each valid password for the second network entity must comply with;
    determining, based on the first and second password specifications, that an aggregate password specification can simultaneously satisfy the first and second password specifications;
    determining an aggregate password specification that satisfies both the first and second password specification by entering characteristics into a table record for each password specification and determining a most stringent entry for each respective characteristic;

prompting a user to input a new password that satisfies the aggregate password specification to reset both a first and second password for the first and second network entities respectively; and guiding the user to input the new password to include a type of character associated with an increased touch score as one of the characters of the new password.

2. The method of claim 1, further comprising assessing a measure of password strength by determining a number of character sets touched by the password specification.

3. The method of claim 2, further comprising increasing the measure of password strength in proportion to password length.

4. The method of claim 2, further comprising prompting the user by dynamically calculating a password strength of the new password as input by the user.

5. The method of claim 1, further comprising displaying to the user a feedback listing that lists aggregated password specification rules that are satisfied and/or not satisfied; and displaying to the user inputs that optimally satisfies the aggregate password specification rules.

6. The method of claim 1, wherein the table record determines one or more incompatible entries for each respective characteristic and determines two or more alternative password specifications.

7. The method of claim 1, further comprising ignoring records for a password specification not accessible by the user.

8. The method of claim 1, further comprising ignoring records for a password specification not selected by the user.

9. The method of claim 1, further comprising entering characteristics selected from a group consisting of minimum password length, maximum password length, minimum number of numerals, and minimum number of symbols.

10. The method of claim 9, further comprising entering characteristics for a minimum number of upper case letters and a minimum number of lower case letters.

11. The method of claim 1, further comprising prompting the user by changing a depiction of a rule when satisfied as characters are entered by the user.

12. The method of claim 11, further comprising prompting the user by changing a depiction of a rule when violated as characters are entered by the user.

13. An apparatus for guiding a user to simultaneously reset a plurality of passwords, comprising:
 a processor;
 a non-transitory memory, wherein the processor executes instructions stored on the non-transitory memory, the instructions comprising:
 a password reset agent that accesses a first password specification for a first network entity and accesses a second password specification for a second network entity, wherein the first password specification comprises a first set of rules that each valid password for the first network entity must comply with, and wherein the second password specification comprises a second set of rules that each valid password for the second network entity must comply with;
 a processing component that determines an aggregate password specification that satisfies both the first and second password specification, wherein the aggregate password specification specifies the minimum requirements that simultaneously satisfy both the first and second password specifications; and
 a user interface that prompts a user to input a new password that satisfies the aggregate password specification to reset both a first and second password for the first and second network entities respectively, wherein the user interface guides the user to input the new password to include a type of character associated with an increased touch score as one of the characters of the new password.

14. The apparatus of claim 13, wherein the processing component determines a number of character sets touched by the password specification to assess a measure of password strength.

15. The apparatus of claim 14, wherein the processing component increases the measure of password strength in proportion to password length.

16. The apparatus of claim 14, wherein the user interface dynamically calculates a password strength of the new password as input by the user and prompts the user based on the password strength.

17. The apparatus of claim 13, wherein the aggregate password specification is determined by entry of characteristics into a table record for each password specification and a determination of a most stringent entry for each respective characteristic.

18. The apparatus of claim 17, wherein the processing component ignores records for a password specification that is at least one of not accessible by the user and not selected by the user.

19. The apparatus of claim 17, wherein the characteristics comprise one or more of minimum password length, maximum password length, minimum number of numerals, or minimum number of symbols.

20. The apparatus of claim 19, wherein the characteristics comprise one or more of a minimum number of upper case letters or a minimum number of lower case letters.

21. The apparatus of claim 13, wherein the user interface prompts the user via a change in a depiction of a rule when satisfied as characters are entered by the user.

22. The apparatus of claim 21, wherein the user interface prompts the user via a change in a depiction of a rule when violated as characters are entered by the user.

23. A non-transitory memory that stores instructions executed by a processor, the instructions comprising:
 a first set of instructions for accessing a first password specification for a first network entity, wherein the first password specification comprises a first set of rules that each valid password for the first network entity must comply with;
 a second set of instructions for accessing a second password specification for a second network entity, wherein the second password specification comprises a second set of rules that each valid password for the second network entity must comply with;
 a third set of instructions for determining an aggregate password specification that satisfies both the first and second password specification, wherein the third set of instructions includes a subset of instructions for reconciling a discrepancy between the first password specification and the second password specification;
 a fourth set of instructions for prompting a user to input a new password that satisfies the aggregate password specification to reset both a first and second password for the first and second network entities respectively; and
 a fifth set of instructions for providing suggestion of a unique password that is compliant with the aggregate password specification, wherein the suggestion guides the user to input the new password to include a type of character associated with an increased touch score as one of the characters of the new password.

24. The instructions of claim 23, wherein the subset of instructions for reconciling a discrepancy between the first password specification and the second password specification enforces at least a portion of the first password specification and the second password specification, wherein the enforced portion of the first password specification and second password specification is at least one of a larger touch score, a longer minimum length, and a rejection of a user name from one of the first password specification and the second password specification.

* * * * *